US011410336B2

(12) United States Patent
Griffin

(10) Patent No.: US 11,410,336 B2
(45) Date of Patent: Aug. 9, 2022

(54) VISUAL SIGNAL PROCESSING OF SIGNALS

(71) Applicant: The Boeing Company, Chicago, IL (US)

(72) Inventor: Steven F. Griffin, Kihei, HI (US)

(73) Assignee: The Boeing Company, Chicago, IL (US)

(*) Notice: Subject to any disclaimer, the term of this patent is extended or adjusted under 35 U.S.C. 154(b) by 505 days.

(21) Appl. No.: 16/589,512

(22) Filed: Oct. 1, 2019

(65) Prior Publication Data

US 2021/0097720 A1 Apr. 1, 2021

(51) Int. Cl.
*G06T 7/90* (2017.01)
*G06K 9/00* (2022.01)
*G01J 3/28* (2006.01)

(52) U.S. Cl.
CPC .............. *G06T 7/90* (2017.01); *G01J 3/2823* (2013.01); *G06K 9/00503* (2013.01); *G06T 2207/10024* (2013.01); *G06T 2207/10032* (2013.01); *G06T 2207/20021* (2013.01); *G06T 2207/20081* (2013.01)

(58) Field of Classification Search
CPC ............ G06T 7/90; G06T 2207/10024; G06T 2207/10032; G06T 2207/20021; G06T 2207/20081; G01J 3/2823; G06K 9/00503; G06K 9/00496
See application file for complete search history.

(56) References Cited

U.S. PATENT DOCUMENTS 11,243,322 B2 * 2/2022 Li ..................... G01V 1/325
2020/0279408 A1 * 9/2020 Osoekawa ............... G06N 3/04

FOREIGN PATENT DOCUMENTS

| CN | 110945519 | * 7/2018 |
| JP | 2017-516131 | * 6/2017 |
| WO | WO 2017/134057 | * 10/2017 |

OTHER PUBLICATIONS

Owens et al., "Audio-Visual Scene Analysis with Self-Supervised Multisensory Features", ECCV 2018 (Year: 2018).*
Machine translation for CN 110945519 (Year: 2018).*
Machine translation for JP 2017-516131 (Year: 2017).*
Machine translation for WO 2017/134057 (Year: 2017).*

* cited by examiner

*Primary Examiner* — Qian Yang
(74) *Attorney, Agent, or Firm* — Sage Patent Group

(57) ABSTRACT

A method for visual signal processing of a signal includes subdividing a signal, by a signal processor, into a selected number (n) of sets of data. The method also includes assembling the signal, by the signal processor, into an image. The image includes a matrix. The matrix includes a plurality of cells in a predetermined number (m) of columns and the selected number (n) of rows. Each cell of the matrix includes a particular color corresponding to an amplitude of a sample of the signal represented by the cell. The method also includes analyzing the image, by the signal processor, using an image detection algorithm to determine frequency information of the signal.

27 Claims, 12 Drawing Sheets

VISUAL SIGNAL PROCESSING OF SIGNALS

FIELD

The present disclosure relates to signal processing and more particularly to visual signal processing of signals.

BACKGROUND

Traditional signal processing techniques are often inadequate and require extensive processing to identify patterns in transient data that is time-varying or that includes low signal-to-noise ratios. Additionally, traditional signal processing techniques are inadequate and require extensive processing for pattern recognition of Fourier components and detecting time-varying Fourier components of a signal.

SUMMARY

In accordance with an embodiment, a method for visual signal processing of a signal includes subdividing a signal, by a signal processor, into a selected number (n) of sets of data. The method also includes assembling the signal, by the signal processor, into an image. The image includes a matrix. The matrix includes a plurality of cells in a predetermined number (m) of columns and the selected number (n) of rows. Each cell of the matrix includes a particular color corresponding to an amplitude of a sample of the signal represented by the cell. The method further includes analyzing the image, by the signal processor, using an image detection algorithm to determine frequency information of the signal.

In accordance with another embodiment, a method for visual signal processing of a signal includes receiving, by an active data collection device, a signal, wherein the signal includes a noisy, time-varying signal. The method also includes subdividing a signal into a selected number (n) of sets of data. The signal includes a noisy, time-varying signal. The method also includes assembling the signal into a plurality of images. Each image includes a matrix and each matrix includes a plurality of cells in a different predetermined number of columns corresponding to a preset number of samples of the signal. Each cell of each matrix includes a particular color corresponding to an amplitude of the sample of the signal represented by the cell. The method also includes analyzing each image to identify a particular periodic signal from the noisy, time-varying signal.

In accordance with another embodiment, a system for visual signal processing of a signal includes a signal processor and a memory associated with the signal processor. The memory includes computer-readable program instructions that, when executed by the signal processor causes the processor to perform a set of functions including subdividing a signal into a selected number (n) of sets of data. The set of functions also include assembling the signal into an image. The image includes a matrix. The matrix includes a plurality of cells in a predetermined number (m) of columns and the selected number (n) of rows. Each cell of the matrix includes a particular color corresponding to an amplitude of the sample of the signal represented by the cell. The set of functions also include analyzing the image using an image detection algorithm to determine frequency information of the signal.

In accordance with an embodiment and any of the preceding embodiments, wherein each column of the matrix corresponds to a set of the predetermined number (m) of samples of the signal and each row corresponds to a set of data of the selected number (n) of sets of data of the signal.

In accordance with an embodiment and any of the preceding embodiments, wherein the method and system further include selecting the selected number (n) of sets of data and a predetermined number of samples (m) of the signal to identify a set of specific frequencies that exist in the signal and a set of harmonics that exist in the signal.

In accordance with an embodiment and any of the preceding embodiments, wherein analyzing the image includes detecting a fundamental frequency of the signal from a pattern of different colors of the cells of the matrix.

In accordance with an embodiment and any of the preceding embodiments, wherein analyzing the image includes detecting a fundamental frequency and at least a first harmonic frequency of each frequency band of the signal from a pattern of colors of the cells of the matrix.

In accordance with an embodiment and any of the preceding embodiments, wherein the signal is a time domain signal and the method and system further include transforming the signal from the time domain to a frequency domain based on analyzing the image.

In accordance with an embodiment and any of the preceding embodiments, wherein analyzing the image includes determining a frequency pattern of the signal from a pattern of different colors of the cells of the matrix.

In accordance with an embodiment and any of the preceding embodiments, wherein the signal includes a transient signal and wherein analyzing the image includes identifying one or more patterns in the transient signal that provide information about a frequency content of the signal.

In accordance with an embodiment and any of the preceding embodiments, wherein assembling the signal into an image includes assembling the data in the signal into more than one image and identifying information in the images that provides the frequency information.

In accordance with an embodiment and any of the preceding embodiments, wherein the method and system further include using a machine learning algorithm to form the image into a plurality of vertical bars and determining a frequency of the signal based on a repetition of a particular color of the vertical bars.

In accordance with an embodiment and any of the preceding embodiments, wherein assembling the image includes assembling a plurality of images. Each image includes a matrix and each matrix includes at least a different predetermined number of columns corresponding to a different number of samples of the signal in each matrix. The method and system further include detecting a different periodic frequency of the signal from each image based on a pattern of different colors of cells in the matrix of each image.

In accordance with an embodiment and any of the preceding embodiments, wherein the signal comprises multiple signals and assembling the image comprises assembling the multiple signals into a plurality of images, each image comprising a matrix and each matrix comprising a predetermined number of columns corresponding to a preset number of samples of each signal of the multiple signals, the method further comprising detecting a particular signal from the multiple signals using the plurality of images.

In accordance with an embodiment and any of the preceding embodiments, wherein the detecting the particular signal from the multiple signals using the images is performed by machine learning.

In accordance with an embodiment and any of the preceding embodiments, the method and system further include receiving the signal by an active data collection device. The signal includes a noisy, time-varying signal and analyzing the image includes identifying a periodic signal from the noisy, time-varying signal.

In accordance with an embodiment and any of the preceding embodiments, wherein the active data collection device comprises a ground telescope/laser receiver of a ground station and the noisy, time-varying signal is received from a spacecraft.

In accordance with an embodiment and any of the preceding embodiments, wherein the active data collection device is onboard a spacecraft.

The features, functions, and advantages that have been discussed can be achieved independently in various embodiments or may be combined in yet other embodiments further details of which can be seen with reference to the following description and drawings.

DETAILED DESCRIPTION

Figure 1:
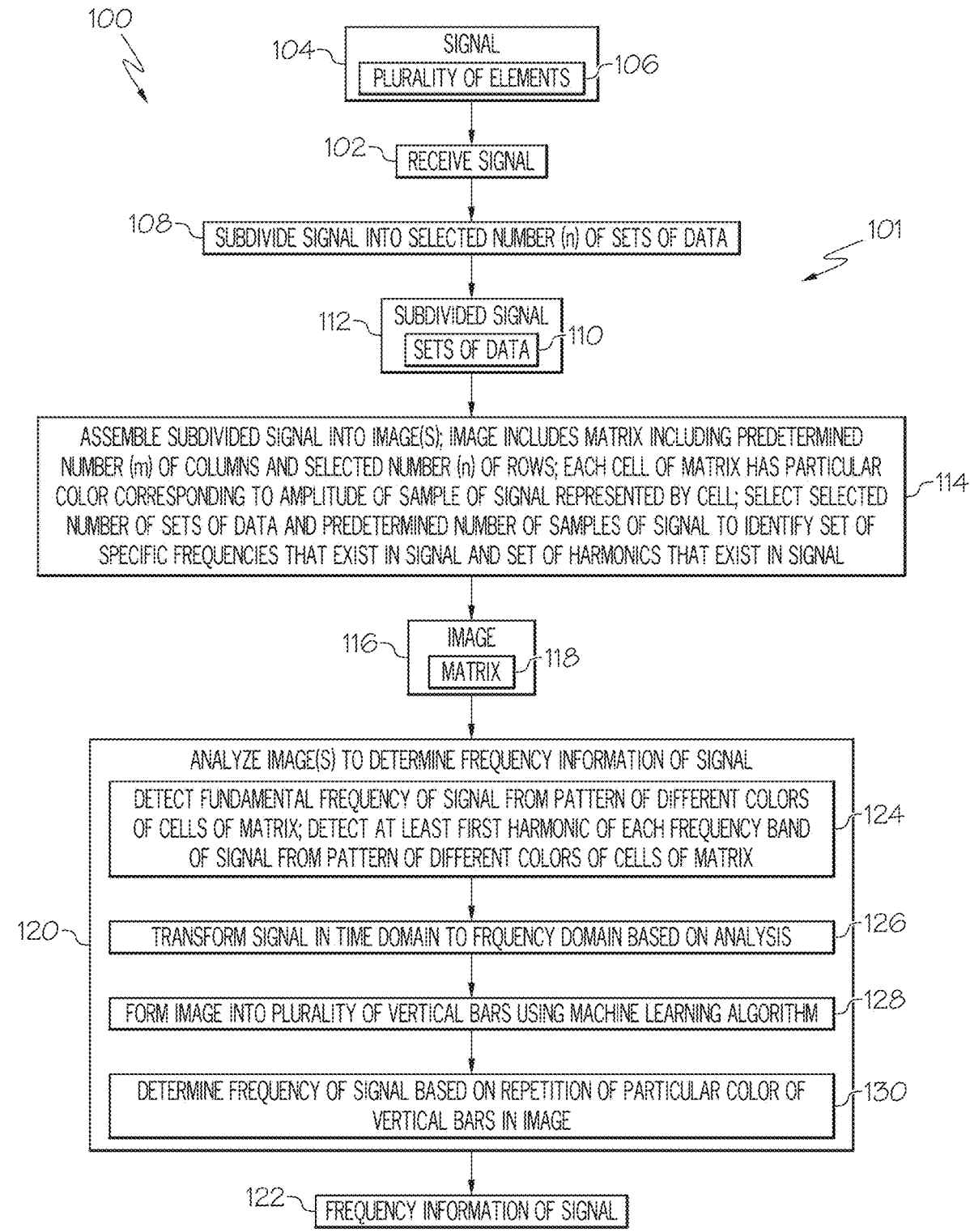
FIG. 1 is a flow chart of an example of a method for visual signal processing of a signal in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 3A:
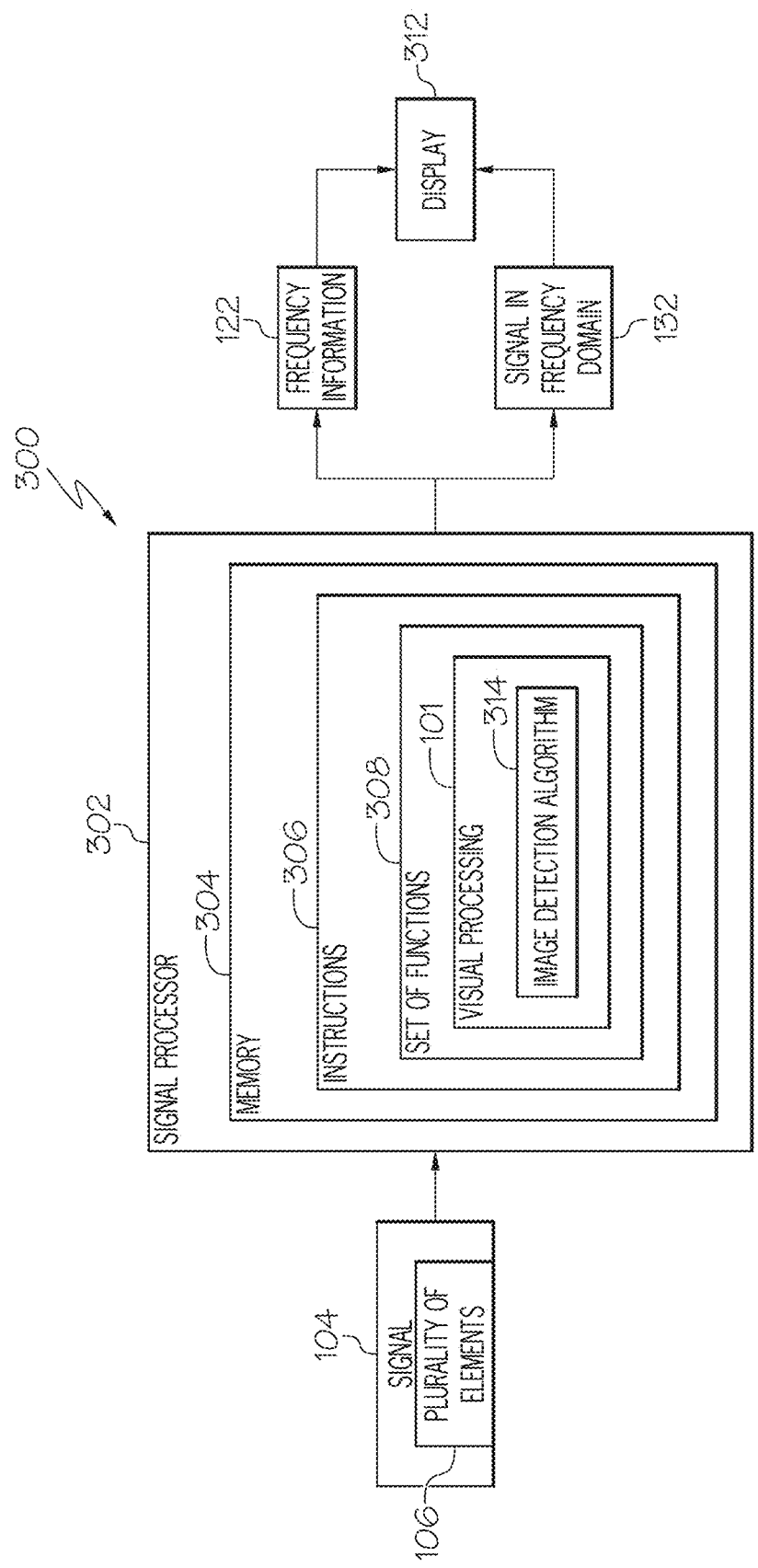
FIG. 3A is a block schematic diagram of an example of a system for visual signal processing of a signal in accordance with an embodiment of the present disclosure.
Figure 4:
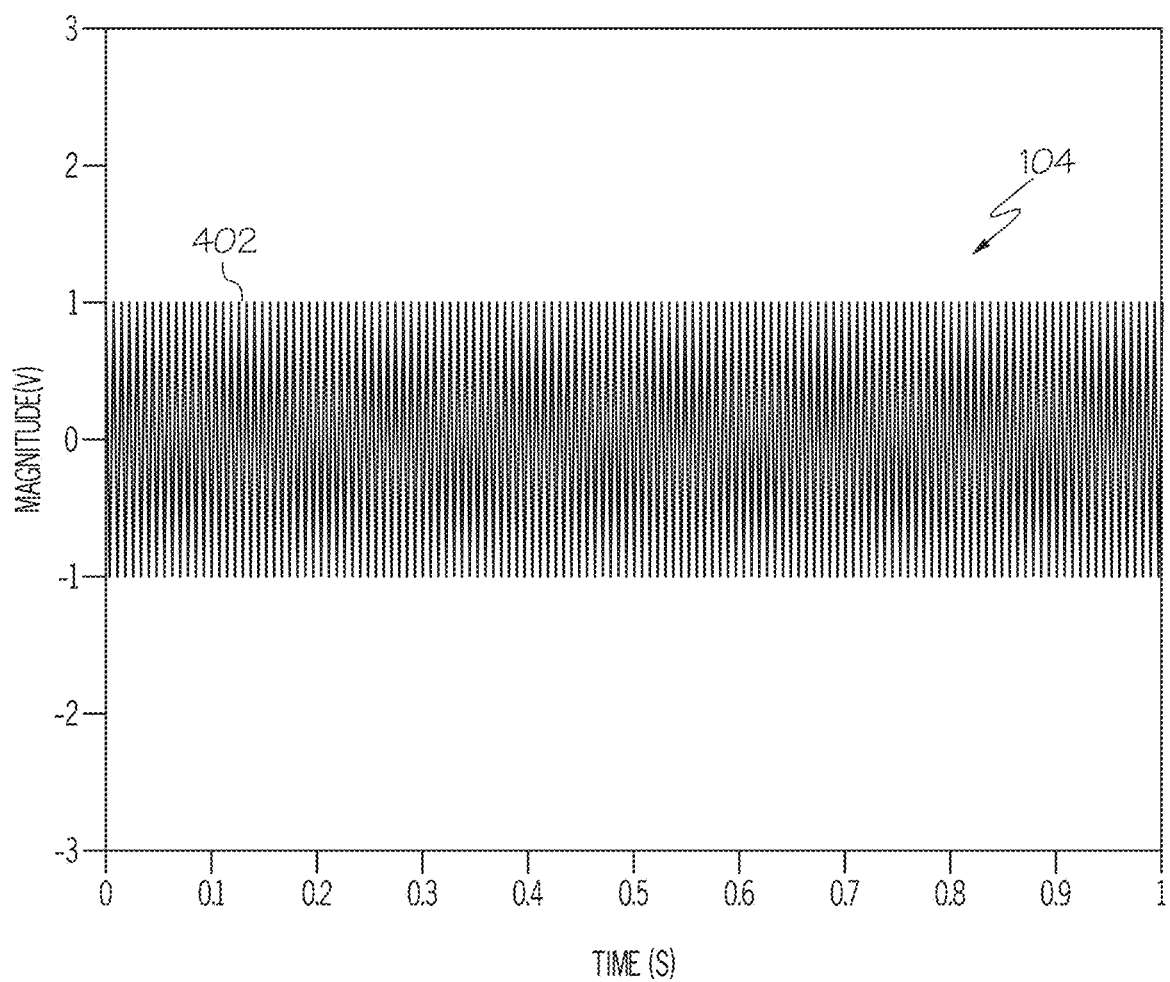
FIG. 4 is an example of a signal received for visual signal processing in accordance with an embodiment of the present disclosure.

FIG. 1 is a flow chart of an example of a method 100 for visual signal processing 101 of a signal 104 in accordance with an embodiment of the present disclosure. In block 102, a signal 104 is received by a signal processor 302. An example of a signal processor 302 configured for visual signal processing 101 of a signal, such as signal 104 or signal 1002 in FIG. 10, will be described in more detail with reference to FIG. 3A. In accordance with an example, the signal 104 comprises a plurality of elements 106, for example, n elements. Each element 106 of the signal 104 or 1002 corresponds to a pixel 107 (FIG. 5) of an image 116 that is formed representing the signal 104 or 1002 as described herein. The pixel 107 includes a color or intensity defined by an amplitude 402 (FIG. 4) of the signal 104 or 1002 that was sampled at a particular time. Referring also to FIG. 4, FIG. 4 is an example of a signal 104 received for visual signal processing 101 in accordance with an embodiment of the present disclosure. The exemplary signal 104 is a sine wave with a frequency of 128 Hertz. The signal 104 is shown in the time domain in FIG. 4, i.e., a time domain signal. While the method 100 is described using a sine wave as the signal 104, the method 100 and system 300 in FIG. 3A are applicable to any signal, such as random signal 1002 in FIG. 10.

Figure 5:
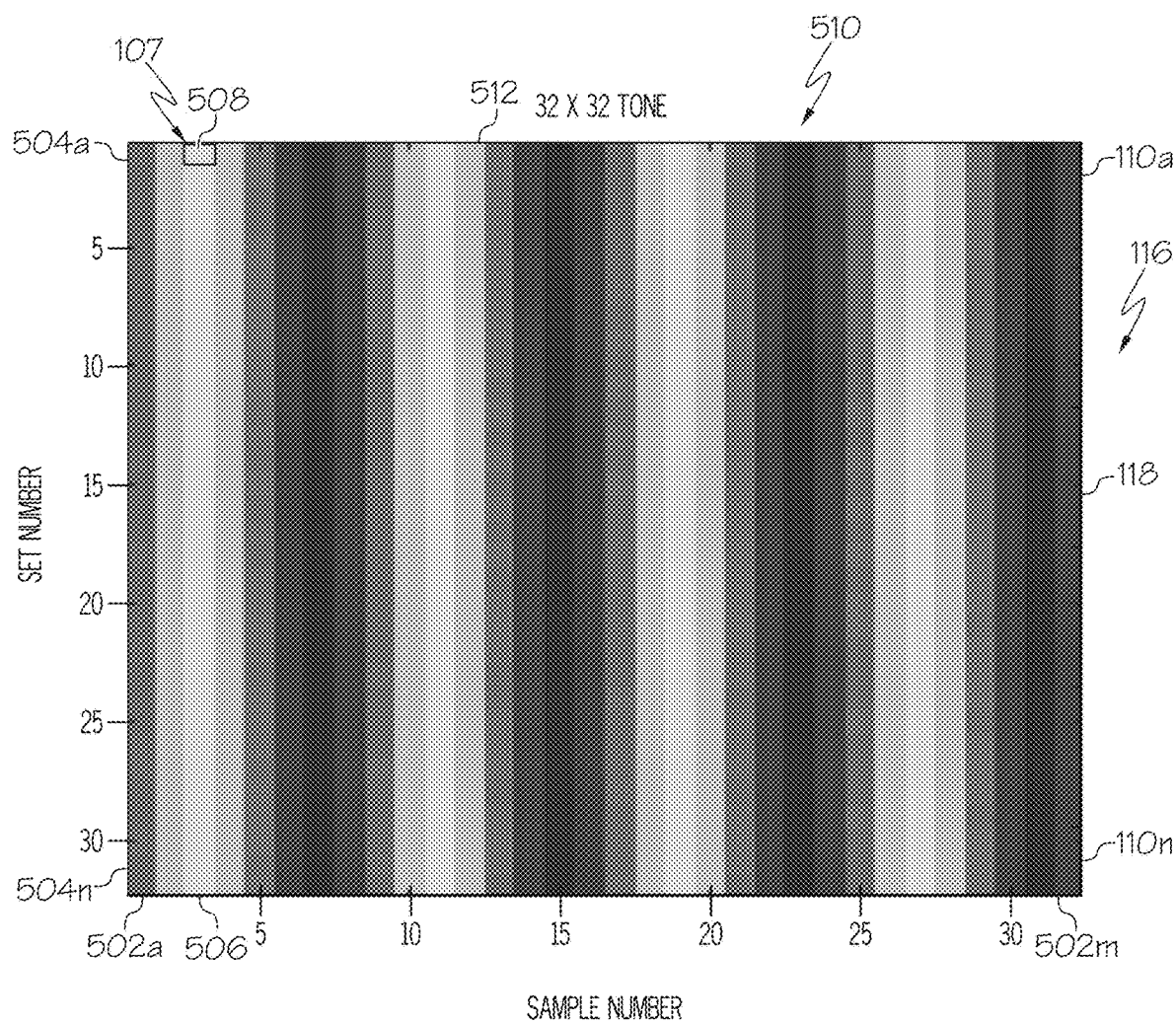
FIG. 5 is an example of an image of the signal in FIG. 4 for visual signal processing of the signal in accordance with an embodiment of the present disclosure.

In block 108, the signal 104 is subdivided into a selected number (n) of sets of data 110 (wherein n is most any natural number greater than 1). In block 114, the subdivided signal 112 is assembled into an image 116. Referring also to FIG. 5, FIG. 5 is an example of an image 116 of the signal 104 in FIG. 4 for visual signal processing 101 of the signal 104 in accordance with an embodiment of the present disclosure. The image 116 includes a matrix 118. The matrix 118 includes a plurality of cells 508 in a predetermined number (m) of columns 502a-502m (wherein m is most any natural number greater than 1) and a selected number (n) of rows 504a-504n. The exemplary matrix 118 in FIG. 5 includes 32 columns 502a-502m and 32 rows 504a-504n. Each column 502a-502m of the matrix 118 corresponds to a set of the predetermined number (m) of samples 506 of the subdivided signal 112 and each row 504a-504n corresponds to a set of data 110 of the selected number (n) of sets of data 110a-110n of the subdivided signal 112. Each cell 508 of the matrix 118 corresponds to a pixel 107 of the image 116. Accordingly, each cell 508 of the matrix 118 includes a particular color corresponding to an amplitude 402 (FIG. 4) of the sample 506 of the signal 104 represented by the cell 508.

In accordance with an embodiment, the selected number (n) of sets of data 110 and the predetermined number of samples (m) of the signal 104 are selected to identify a set of specific frequencies that exist in the signal 104 and a set of harmonics that exist in the signal 104.

In accordance with an embodiment, assembling the signal 104 into an image 116 includes assembling the data in the signal 104 into more than one image 116. Information in the images 116 is identified that provides the frequency information. An example of determining frequency information about a signal, such as signal 104 or signal 1002 (FIG. 10), will be described with reference to FIGS. 2 and 10.

Figure 6:
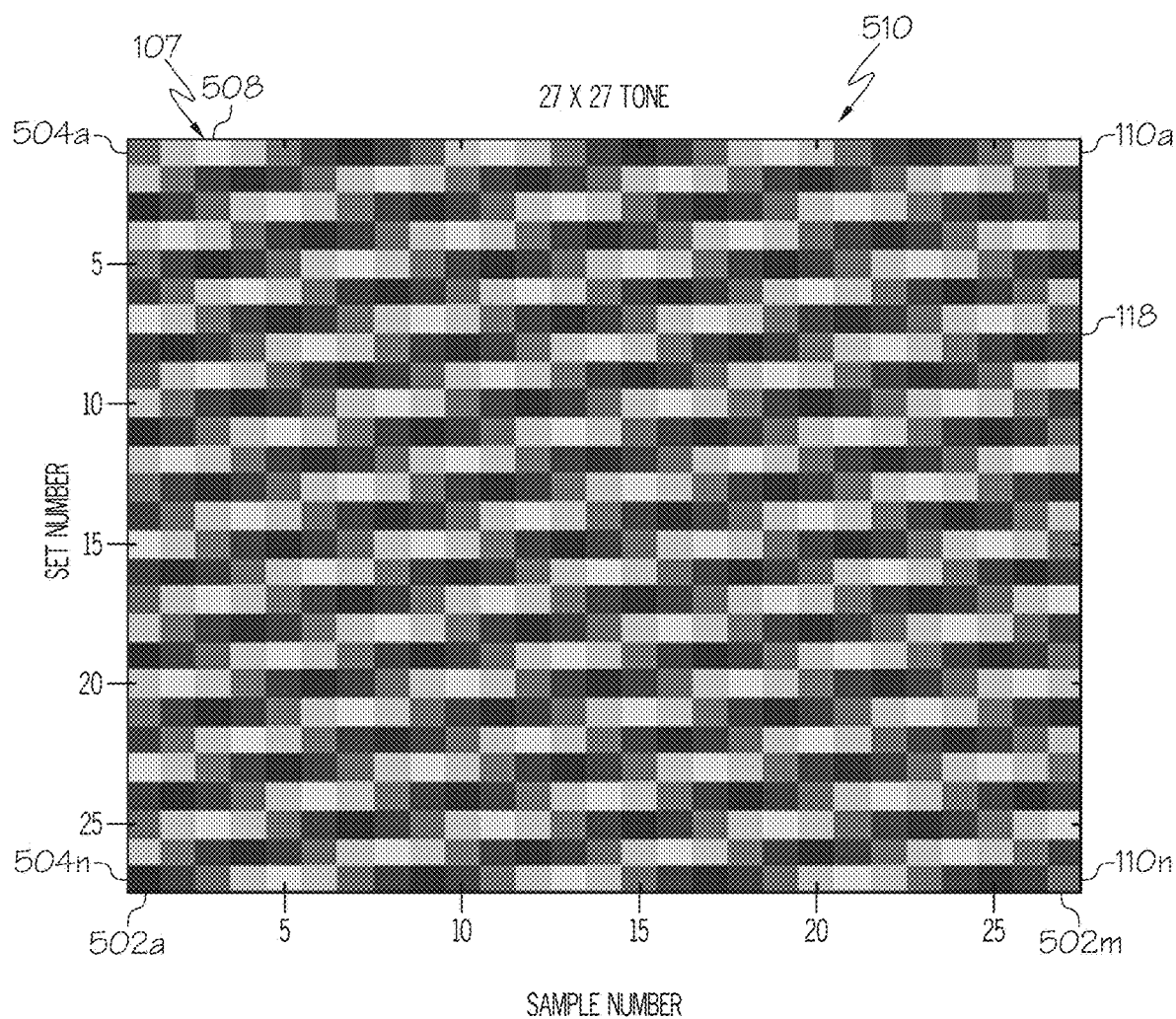
FIG. 6 is an example of another image of the signal in FIG. 4 for visual signal processing of the signal in accordance with an embodiment of the present disclosure.

Referring back to FIG. 1, in block 120, the image 116 or images 116 are analyzed to determine frequency information 122 of the signal 104. In accordance with an example, the image 116 or images 116 are analyzed using an image detection algorithm, such as image detection algorithm 314 in FIG. 3A. In block 124, analyzing the image 116 includes detecting a fundamental frequency of the signal 104 from a pattern 510 (FIG. 5) of different colors of the cells 508 of the matrix 118. Referring also to FIG. 6, FIG. 6 is an example of another image 600 of the signal 104 in FIG. 4 for visual signal processing 101 of the signal 104 in accordance with an embodiment of the present disclosure. The exemplary image 600 is similar to the image 116 in FIG. 5 except the signal 104 is subdivided into 27 sets of data 110. FIGS. 5 and 6 illustrate that the length of each set of data 110, n/m, determines whether a pattern 510 is discernible from the sets of data 110. In accordance with an example, a rule used to detect periodic frequencies is to establish that for a given image width, n/m, frequencies where an even multiple of wavelengths fit will be detected. For the exemplary image 116 of FIG. 5, the width 32 is n/m/fs=$^{32}/_{1024}$ seconds long, where fs is the sampling frequency. In this example, the sampling frequency is 1024 Hz. The tone frequency of 128 Hz is $^{1}/_{128}$ seconds long. This means there will be $^{32}/_{1024}*128=4$ complete cycles in a 32 pixel wide image, such as image 116 in FIG. 5. In general, the $^{32}/_{1024}$ pixel wide image should detect frequencies where f=fs/(n/m)*[1 2 3 . . . ]. Detection, in this case, means there is symmetry about a central time in the image x axis and solid color bands are observed in the vertical direction as illustrated in FIG. 5.

In accordance with an example, the signal 104 includes a transient signal and analyzing the image 116 in block 120 includes identifying one or more patterns 510 in the image 116 that provide information about the frequency content of the signal 104.

Figure 7:
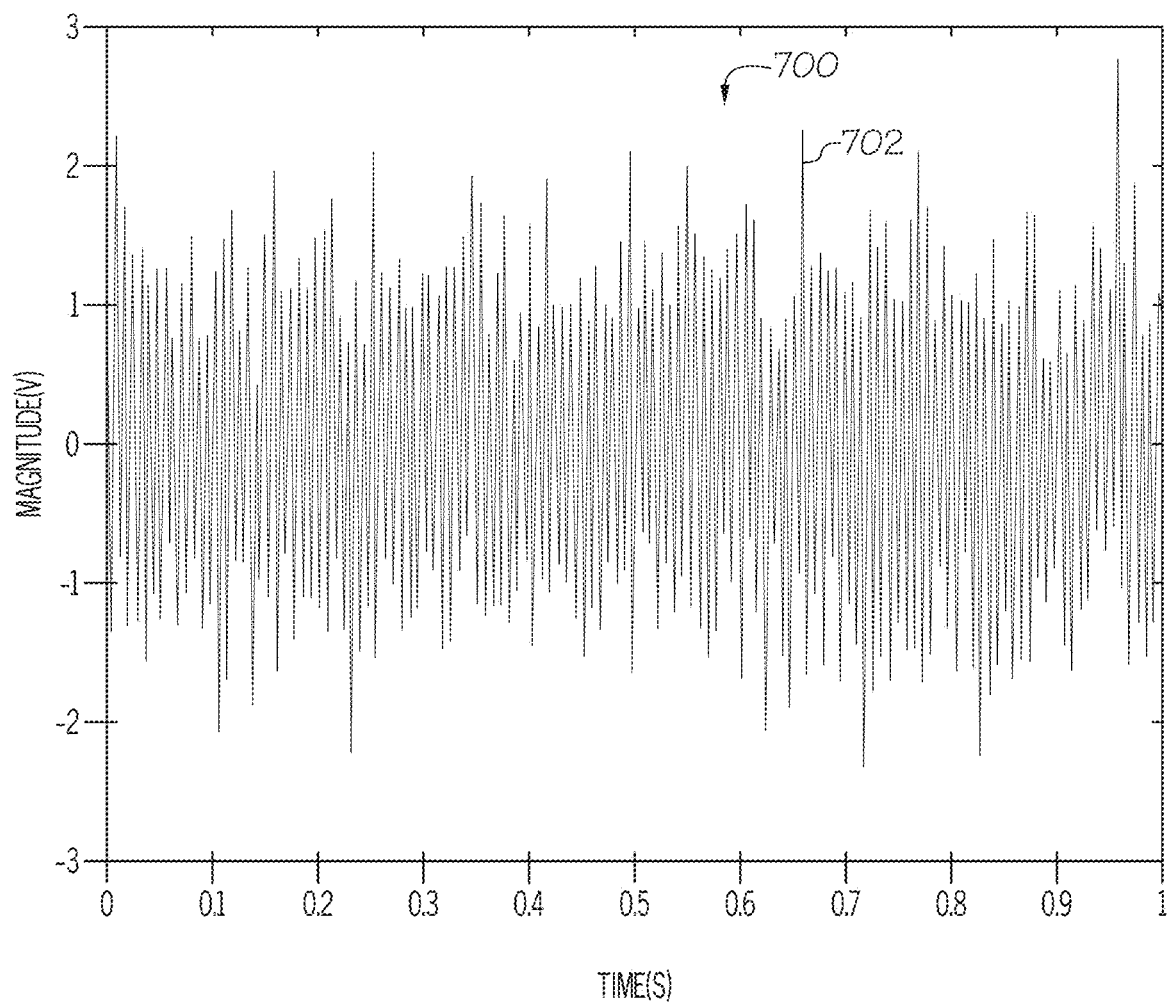
FIG. 7 is an example of another signal with noise that is received for visual signal processing in accordance with an embodiment of the present disclosure.
Figure 8:
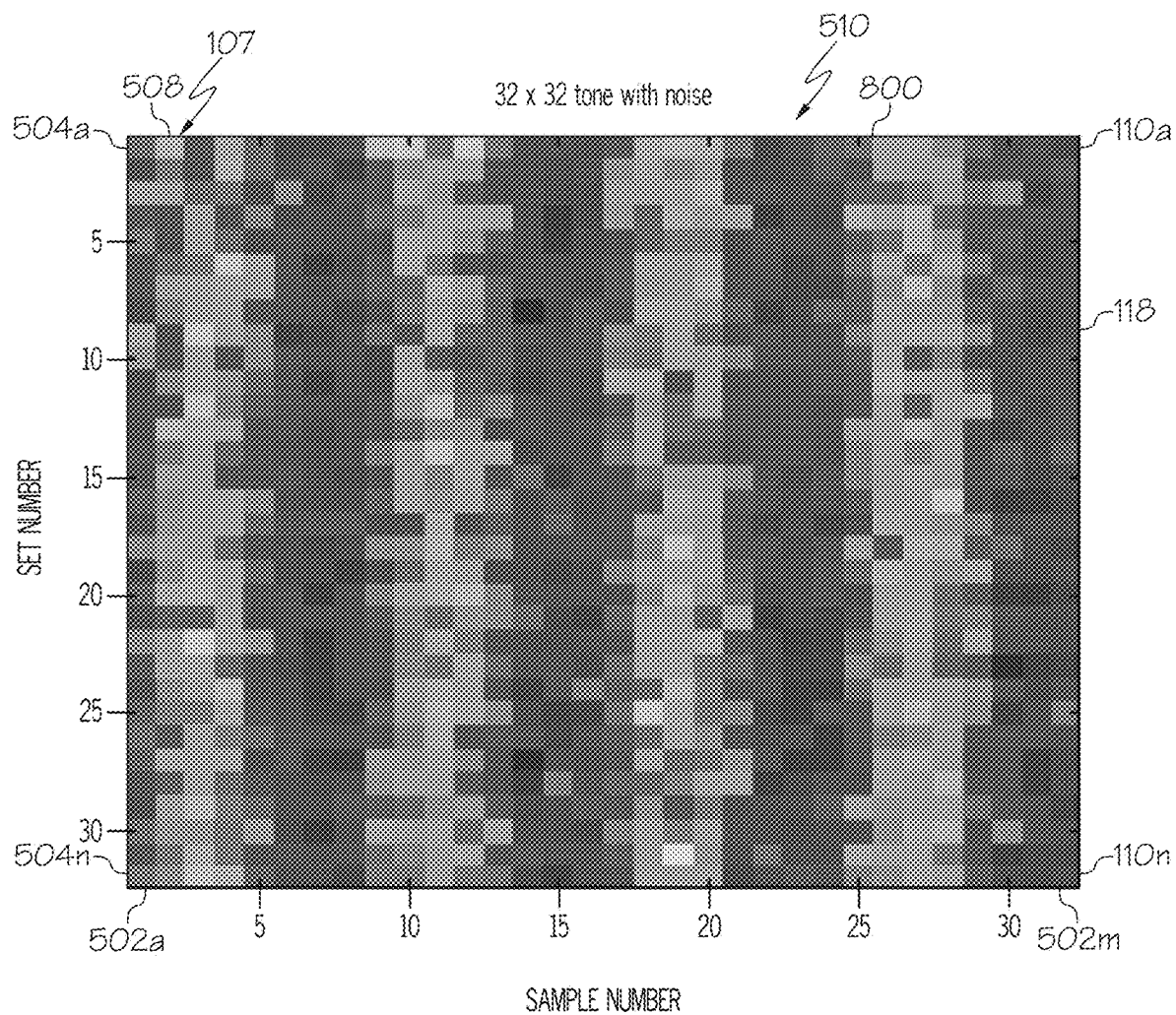
FIG. 8 is an example of an image of the signal of FIG. 7 for visual signal processing in accordance with an embodiment of the present disclosure.
Figure 9:
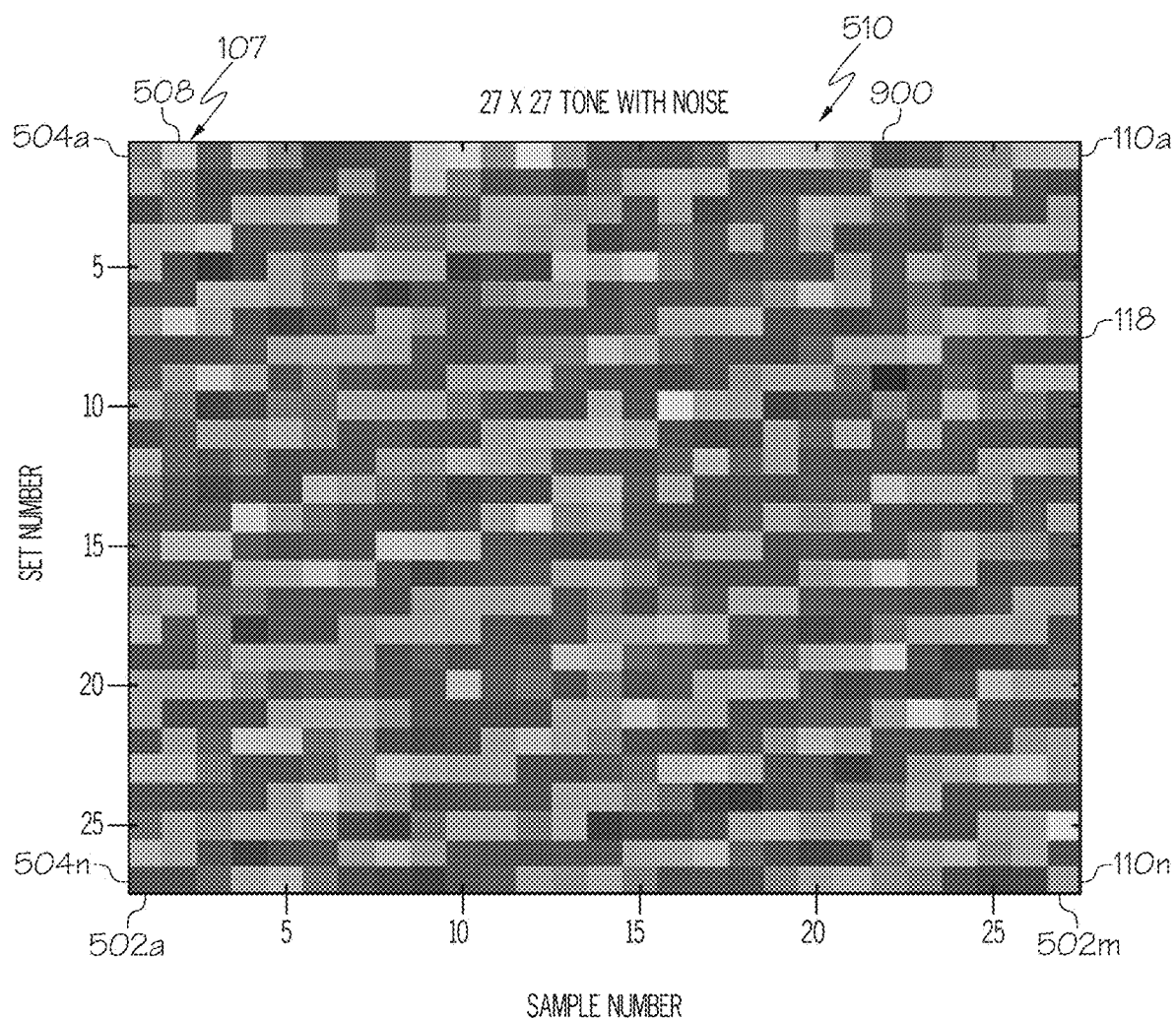
FIG. 9 is an example of another image of the signal of FIG. 7 for visual signal processing in accordance with an embodiment of the present disclosure.

Referring also to FIG. 7, FIG. 7 is an example of another signal 700 with noise 702 that is received for visual signal processing 101 in accordance with an embodiment of the present disclosure. The signal 700 is the signal 104 in FIG. 4 with noise 702 added. Subdividing the signal 700 in block 108 of FIG. 1 and assembling the subdivided signal 112 into images 116 in block 114 of FIG. 1 results in the image 800 in FIG. 8 and the image 900 in FIG. 9. FIG. 8 is an example of an image 800 of the signal 700 of FIG. 7 subdivided into 32 sets of data 110 for visual signal processing 101 of the signal 700. FIG. 9 is an example of an image 900 of the signal 700 subdivided into 27 sets of data for visual signal processing 101. The pattern 510 of different colors of cells 508 in the image 116 in FIG. 5, is a discernible in the image 800 of FIG. 8, although detecting the periodic signal 104 in the time domain representation in FIG. 7 is more difficult with noise 702 added.

Referring back to FIG. 1, in block 124, analyzing the image 116 includes detecting a fundamental frequency and at least a first harmonic frequency of each frequency band of the signal 104 from a pattern 510 of colors of the cells 508 of the matrix 118 as illustrated in FIGS. 5 and 8. Analyzing the image 116 also includes determining a frequency pattern of the signal 104 from a pattern 510 of different colors of the cells 508 of the matrix 118. An example of detecting an unknown periodic frequency from a plurality of images 1006a-1006c will be described with reference to FIG. 10.

In block 126, the signal 104 in the time domain (FIG. 4) is transformed from the time domain to the frequency domain based on the analysis of the image 116. The fundamental frequency and at least the first harmonic frequency of each frequency band are detectable from the pattern 510 of colors of the cells 508 in the matrix 118 as illustrated in FIGS. 5 and 8.

In block 128, the image 116 is formed into a plurality of vertical bars 512, such as the vertical bars 512 illustrated in FIG. 5, using a machine learning algorithm. In block 130, a frequency of the signal 104 is determined based on a repetition of a particular color of the vertical bars 512.

Figure 2:
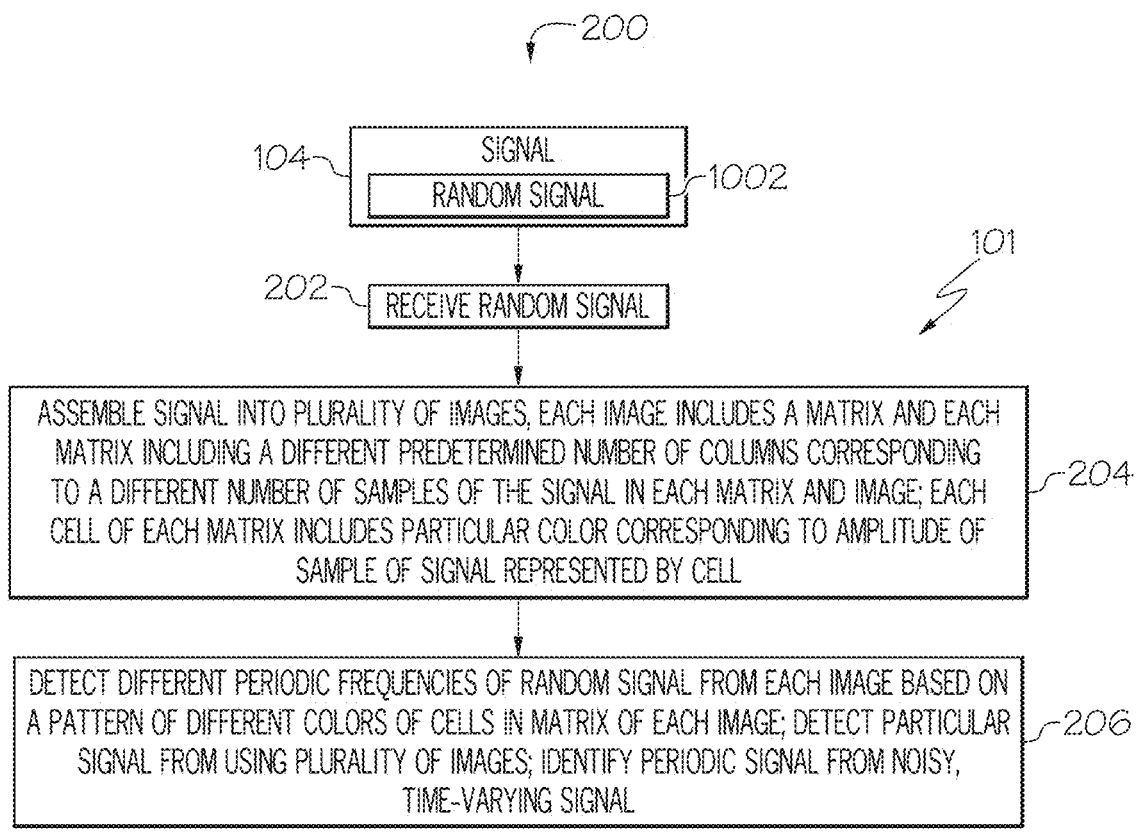
FIG. 2 are a flow chart of an example of a method for visual signal processing of a signal in accordance with another embodiment of the present disclosure.
Figure 10:
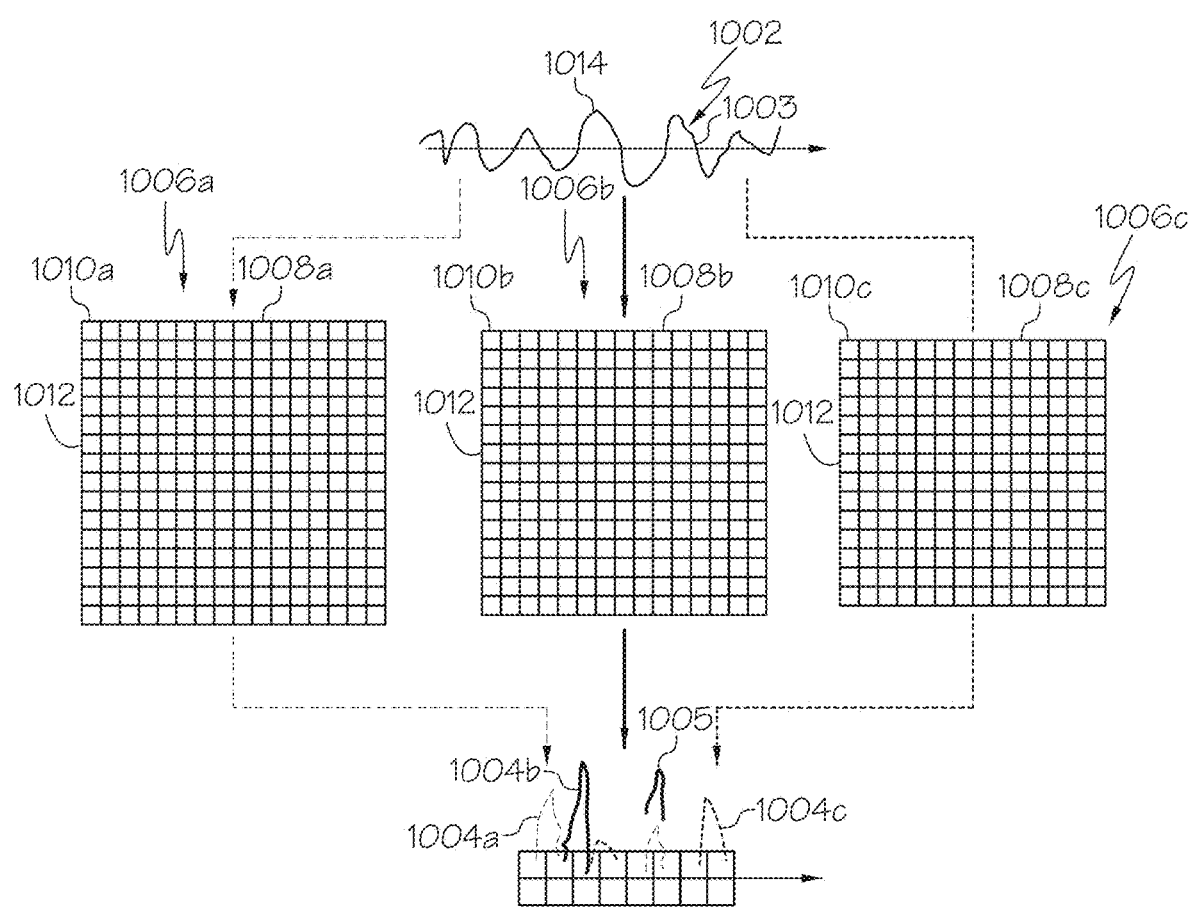
FIG. 10 is an example of detecting different periodic frequencies of a random signal using visual signal processing in accordance with an embodiment of the present disclosure

FIG. 2 are a flow chart of an example of a method 200 for visual signal processing 101 of a signal 104 in accordance with another embodiment of the present disclosure. In block 202, a signal 104 is received. In accordance with an example, the signal 104 is a random signal, such as random signal 1002 in FIG. 10. In accordance with another example, the random signal 1002 includes a combination of multiple signals 1003. The signal 104 or 1002 is received by a signal processor, such as the signal processor 302 in FIG. 3A. Referring also to FIG. 10, FIG. 10 is an example of detecting different periodic frequencies 1004a-1004c of a random signal 1002 using the method 200 of FIG. 2 for visual signal processing in accordance with an embodiment of the present disclosure. The method 200 is also used to detect a particular signal 1005 from the multiple signals 1003 by dividing the multiple signals 1003 into a plurality of images 1006a-1006b. In accordance with an example, the random signal 1002 is subdivided as described in block 108 of FIG. 1.

In block 204, a plurality of images 1006a-1006c are assembled. Each of the images 1006a-1006c are assembled in the same way as image 116 in FIG. 1. Each image 1006a-1006c includes a matrix 1008a-1008c. Each matrix 1008a-1008c includes at least a different predetermined number of columns 1010a-1010c corresponding to a different number or preset number of samples of the random signal 1002 in each matrix 1008a-1008c. Each cell 1012 of each matrix 1008a-1008c includes a particular color that corresponds to an amplitude 1014 of a sample of the random signal 1002 represented by the particular cell 1012.

In block 206, a different periodic frequency 1004a-1004c of the random signal 1002 is detected from each image 1006a-1006c based on a pattern of different colors of the cells 1012 in the matrix 1008a-1008c of each image 1006a-1006c. In accordance with an example, the particular signal 1005 is detected from the multiple signals 1003 by dividing the random signal 1002 including the multiple signals 1003 in the plurality of images 1006a-1006c. In accordance an embodiment, machine learning is used to detecting the particular signal 1005 from the multiple signals 1003 divided into the plurality of images 1006a-1006c is performed by machine learning. For example, a computer, such as signal processor 302 in FIG. 3A, is trained to perform the process. In accordance with another embodiment, a periodic signal 358 is identified from a noisy, time-varying signal 354, as illustrated in FIG. 3B and FIG. 3C, using the method 200.

FIG. 3A is a block schematic diagram of an example of a system 300 for visual signal processing of a signal 104 in accordance with an embodiment of the present disclosure. The system 300 includes a signal processor 302 and a memory 304 associated with the signal processor 302. In the example in FIG. 3A, the memory 304 is shown as a component of the signal processor 302. In accordance with another example, the memory 304 is a separate component from the signal processor 302. The memory 304 includes computer-readable program instructions 306 that, when executed by the signal processor 302 causes the signal processor 302 to perform a set of functions 308. The set of functions 308 include visual signal processing 101 as described herein. In accordance with an embodiment, the method 100 and the method 200 are embodied in the set of functions 308 and are performed by the signal processor 302. The frequency information 122 and signal 104 in the frequency domain 132 are presented on a display 312. As described herein, the system 300 provides a technical solution to the technical problem of analyzing signals, such as noisy, time-varying signals. The signal processor 302 enables a computer system to operate as a special purpose computer system for visual signal processing 101 of a signal 104 as described herein.

Figure 3B:
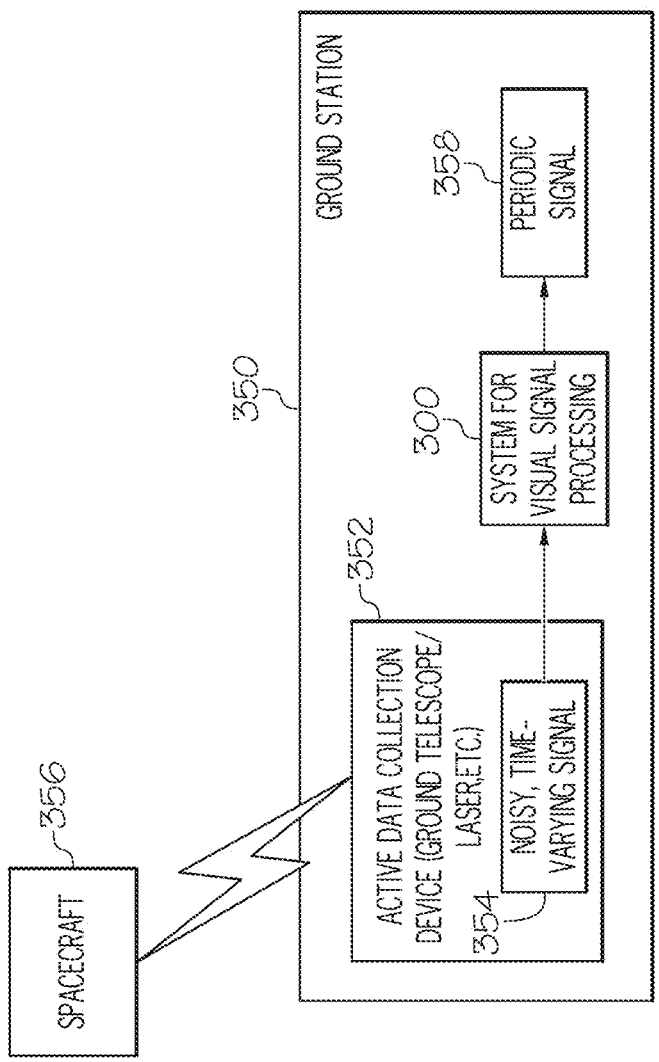
FIG. 3B is a block schematic diagram of an example of a ground station including a system for visual signal processing of a signal in accordance with an embodiment of the present disclosure.

FIG. 3B is a block schematic diagram of an example of a ground station 350 including a system 300 for visual signal processing 101 of a signal 104 in accordance with an embodiment of the present disclosure. The system 300 is the same as the system 300 for visual signal processing 101 described with reference to FIG. 3A. The method 100 in FIG. 1 and the method 200 in FIG. 2 are embodied in and performed by the system 300 in FIG. 3B. The ground station 350 includes an active data collection device 352 configured to receive a noisy, time-varying signal 354 from a spacecraft 356. In accordance with an example, the active data collection device 352 is a ground telescope/laser configured to receive optical signals. The noisy, time-varying signal 354 includes one or more periodic signals, such as periodic signal 358. The noisy, time-varying signal 354 includes noise because of at least the distance between the ground station 350 and the spacecraft 356. The noisy, time-varying signal may also include noise from other sources. In accordance with an example, desired data included in the noisy, time-varying signal 354 includes a periodic component that is coherently related to rotating machinery onboard the spacecraft 356. The noisy, time-varying signal 354 is processed by the system 300 for visually signal processing 101 as described herein with respect to method 100 in FIG. 1 or method 200 in FIG. 2 to identify the periodic signal 358 from the noisy, time-varying signal 354. In accordance with the example, the periodic signal 358 includes the desired data.

Figure 3C:
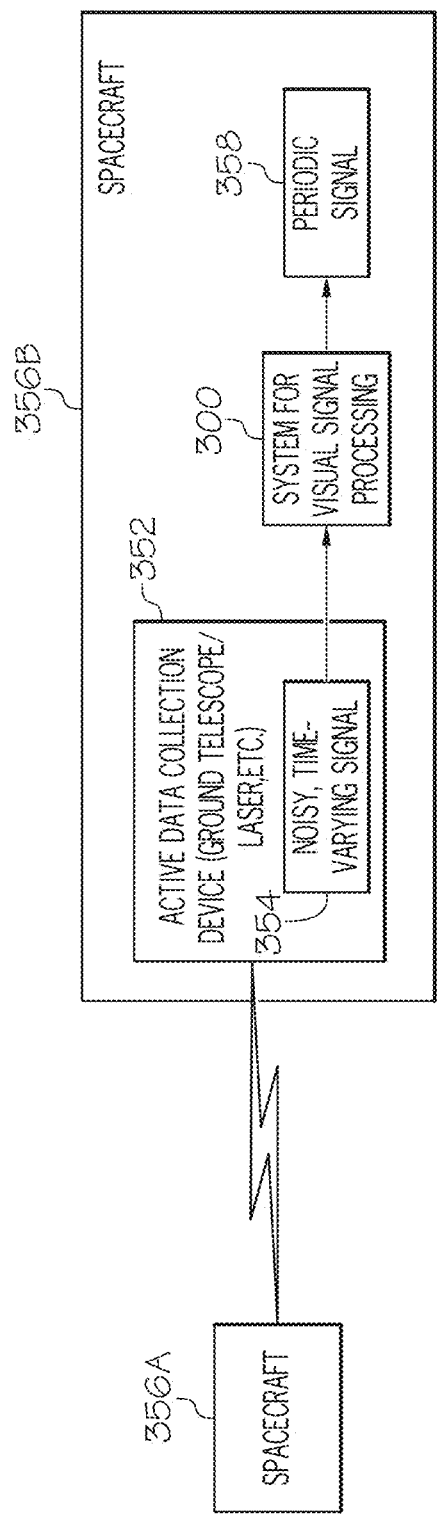
FIG. 3C is a block schematic diagram of an example of a spacecraft including a system for visual signal processing of a signal in accordance with an embodiment of the present disclosure.

FIG. 3C is a block schematic diagram of an example of a spacecraft 356b including a system 300 for visual signal processing 101 of a signal 104 in accordance with embodiment of the present disclosure. FIG. 3C is similar to FIG. 3B except the active data collection device 352 and the system 300 for visual signal processing 101 are onboard a spacecraft 356b. The active data collection device 352 receives a noisy, time-varying signal 354 from another spacecraft 356a. The system 300 for visual signal processing 101 processes the noisy, time-varying signal 354 as previously described to identify the period signal 358 including the desired data from the noisy, time-varying signal 354.

Further, the disclosure comprises embodiments according to the following clauses:

Clause 1. A method for visual signal processing of a signal, comprising:
  subdividing a signal, by a signal processor, into a selected number (n) of sets of data;
  assembling the signal, by the signal processor, into an image, the image comprising a matrix, the matrix comprising a plurality of cells in a predetermined number (m) of columns and the selected number (n) of rows, wherein each cell of the matrix comprises a particular color corresponding to an amplitude of a sample of the signal represented by the cell; and
  analyzing the image, by the signal processor, using an image detection algorithm to determine frequency information of the signal.

Clause 2. The method of clause 1, wherein each column of the matrix corresponds to a set of the predetermined number (m) of samples of the signal and each row corresponds to a set of data of the selected number (n) of sets of data of the signal.

Clause 3. The method of any of clauses 1 or 2, further comprising selecting the selected number (n) of sets of data and a predetermined number of samples (m) of the signal to identify a set of specific frequencies that exist in the signal and a set of harmonics that exist in the signal.

Clause 4. The method of any of clauses 1, 2, or 3, wherein analyzing the image comprises detecting a fundamental frequency of the signal from a pattern of different colors of the cells of the matrix.

Clause 5. The method of any of clauses 1-3, or 4, wherein analyzing the image comprises detecting a fundamental frequency and at least a first harmonic frequency of each frequency band of the signal from a pattern of colors of the cells of the matrix.

Clause 6. The method of any of clauses 1-4, or 5, wherein the signal is a time domain signal and the method further comprises transforming the signal from the time domain to a frequency domain based on analyzing the image.

Clause 7. The method of any of clauses 1-5, or 6, wherein analyzing the image comprises determining a frequency pattern of the signal from a pattern of different colors of the cells of the matrix.

Clause 8. The method of any of clauses 1-6, or 7, wherein the signal comprises a transient signal and wherein analyzing the image comprises identifying one or more patterns in the transient signal that provide information about a frequency content of the signal.

Clause 9 The method of any of clauses 1-7, or 8, wherein assembling the signal into an image comprises: assembling the data in the signal into more than one image; and identifying information in the images that provides the frequency information.

Clause 10. The method of any of clauses 1-8, or 9, further comprising: using a machine learning algorithm to form the image into a plurality of vertical bars; and determining a frequency of the signal based on a repetition of a particular color of the vertical bars.

Clause 11. The method of any of clauses 1-9, or 10, wherein assembling the image comprises assembling a plurality of images, each image comprising a matrix and each matrix comprising at least a different predetermined number of columns corresponding to a different number of samples of the signal in each matrix, the method further comprising detecting a different periodic frequency of the signal from each image based on a pattern of different colors of cells in the matrix of each image.

Clause 12. The method of any of clauses 1-10, or 11, wherein the signal comprises multiple signals and assembling the image comprises assembling the multiple signals into a plurality of images, each image comprising a matrix and each matrix comprising a predetermined number of columns corresponding to a preset number of samples of each signal of the multiple signals, the method further comprising detecting a particular signal from the multiple signals using the plurality of images.

Clause 13. The method of any of clauses 1-11, or 12, wherein the detecting the particular signal from the multiple signals using the images is performed by machine learning.

Clause 14. The method of any of clauses 1-12, or 13 further comprising receiving the signal by an active data collection device, wherein the signal comprises a noisy, time-varying signal and wherein analyzing the image comprises identifying a periodic signal from the noisy, time-varying signal.

Clause 15. The method of any of clauses 1-13, or 14, wherein the active data collection device comprises a ground telescope/laser receiver of a ground station and the noisy, time-varying signal is received from a spacecraft.

Clause 16. The method of any of clauses 1-14 or 15, wherein the active data collection device is onboard a spacecraft.

Clause 17. A method for visual signal processing of a signal, comprising:
  receiving, by an active data collection device, a signal, wherein the signal comprises a noisy, time-varying signal;
  subdividing the signal into a selected number (n) of sets of data;
  assembling the signal into a plurality of images, each image comprising a matrix and each matrix comprising a plurality of cells in a different predetermined number of columns corresponding to a preset number of samples of the signal, wherein each cell of each matrix comprises a particular color corresponding to an amplitude of the sample of the signal represented by the cell; and
  analyzing each image to identify a particular periodic signal from the noisy, time-varying signal.

Clause 18. The method of clause 17, wherein the active data collection device comprises a ground telescope/laser receiver of a ground station and the noisy, time-varying signal is received from a spacecraft.

Clause 19. The method of any of clause 17 or 18, wherein the active data collection device is onboard a spacecraft.

Clause 20. A system for visual signal processing of a signal, comprising:
   a signal processor; and
   a memory associated with the signal processor, the memory comprising computer-readable program instructions that, when executed by the signal processor causes the processor to perform a set of functions comprising:
   subdividing a signal into a selected number (n) of sets of data;
   assembling the signal into an image, the image comprising a matrix, the matrix comprising a plurality of cells in a predetermined number (m) of columns and the selected number (n) of rows, wherein each cell of the matrix comprises a particular color corresponding to an amplitude of the sample of the signal represented by the cell; and
   analyzing the image using an image detection algorithm to determine frequency information of the signal.

Clause 21. The system of clause 20, wherein analyzing the image comprises detecting a fundamental frequency of the signal from a pattern of different colors of the cells of the matrix.

Clause 22. The system of any of clauses 20 or 21, wherein the signal is a time domain signal and the set of functions further comprises transforming the signal from the time domain to a frequency domain based on analyzing the image.

Clause 23. The system of any of clauses 20-21, or 22, wherein the set of functions further comprises selecting the selected number (n) of sets of data and the predetermined number of samples (m) of the signal to identify a set of specific frequencies that exist in the signal and a set of harmonics that exist in the signal.

Clause 24. The system of any of clauses 20-22, or 23, wherein the signal comprises a transient signal and wherein analyzing the image comprises identifying one or more patterns in the transient signal that provide information about a frequency content of the signal.

Clause 25. The system of any of clauses 20-23, or 24, wherein assembling the signal into an image comprises: assembling the data in the signal into more than one image; and identifying information in the images that provides the frequency information.

Clause 26. The system of any of clauses 20-24, or 25, wherein the set of functions further comprises: using a machine learning algorithm to form the image into a plurality of vertical bars; and determining a frequency of the signal based on a repetition of a particular color of the vertical bars.

Clause 27. The system of any of clauses 20-25, or 26, wherein assembling the image comprises assembling a plurality of images, each image comprising a matrix and each matrix comprising at least a different predetermined number of columns corresponding to a different number of samples of the signal in each matrix, the set of functions further comprising detecting a different periodic frequency of the signal from each image based on a pattern of different colors of cells in the matrix of each image.

Clause 28. The system of any of clauses 20-26, or 27, wherein each column of the matrix corresponds to a set of the predetermined number (m) of samples of the signal and each row corresponds to a set of data of the selected number (n) of sets of data of the signal.

Clause 29. The system of any of clauses 20-27, or 28, wherein analyzing the image comprises detecting a fundamental frequency and at least a first harmonic frequency of each frequency band of the signal from a pattern of colors of the cells of the matrix.

Clause 30. The system of any of clauses 20-28, or 29, wherein analyzing the image comprises determining a frequency pattern of the signal from a pattern of different colors of the cells of the matrix.

Clause 31. The system of any of clauses 20-29, or 30, wherein the signal comprises multiple signals and assembling the image comprises assembling the multiple signals into a plurality of images, each image comprising a matrix and each matrix comprising a predetermined number of columns corresponding to a preset number of samples of each signal of the multiple signals, the method further comprising detecting a particular signal from the multiple signals using the plurality of images.

Clause 32. The system of any of clauses 20-30, or 31, wherein the detecting the particular signal from the multiple signals using the images is performed by machine learning.

Clause 33. The system of any of clauses 20-31, or 32, wherein the set of functions further comprises receiving the signal by an active data collection device, wherein the signal comprises a noisy, time-varying signal and wherein analyzing the image comprises identifying a periodic signal from the noisy, time-varying signal.

Clause 34. The system of any of clauses 20-32, or 33, wherein the active data collection device comprises a ground telescope/laser receiver of a ground station and the noisy, time-varying signal is received from a spacecraft.

Clause 35. The system of any of clauses 20-33, or 34, wherein the active data collection device is onboard a spacecraft.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A method for visual signal processing of a signal, comprising:
    subdividing a signal, by a signal processor, into a selected number (n) of sets of data;
    assembling the signal, by the signal processor, into an image, the image comprising a matrix, the matrix comprising a plurality of cells in a predetermined number (m) of columns and the selected number (n) of rows, wherein each cell of the matrix comprises a particular color corresponding to an amplitude of a sample of the signal represented by the cell; and
    analyzing the image, by the signal processor, using an image detection algorithm to determine frequency information of the signal.

2. The method of claim 1, wherein each column of the matrix corresponds to a set of the predetermined number (m) of samples of the signal and each row corresponds to a set of data of the selected number (n) of sets of data of the signal.

3. The method of claim 2, further comprising selecting the selected number (n) of sets of data and the predetermined number of samples (m) of the signal to identify a set of specific frequencies that exist in the signal and a set of harmonics that exist in the signal.

4. The method of claim 1, wherein analyzing the image comprises detecting a fundamental frequency of the signal from a pattern of different colors of the cells of the matrix.

5. The method of claim 1, wherein analyzing the image comprises detecting a fundamental frequency and at least a first harmonic frequency of each frequency band of the signal from a pattern of colors of the cells of the matrix.

6. The method of claim 1, wherein the signal is a time domain signal and the method further comprises transforming the signal from the time domain to a frequency domain based on analyzing the image.

7. The method of claim 1, wherein analyzing the image comprises determining a frequency pattern of the signal from a pattern of different colors of the cells of the matrix.

8. The method of claim 1, wherein the signal comprises a transient signal and wherein analyzing the image comprises identifying one or more patterns in the transient signal that provide information about a frequency content of the signal.

9. The method of claim 1, wherein assembling the signal into an image comprises:
    assembling the data in the signal into more than one image; and
    identifying information in the images that provides the frequency information.

10. The method of claim 1, further comprising:
    using a machine learning algorithm to form the image into a plurality of vertical bars; and
    determining a frequency of the signal based on a repetition of a particular color of the vertical bars.

11. The method of claim 1, wherein assembling the image comprises assembling a plurality of images, each image comprising a matrix and each matrix comprising at least a different predetermined number of columns corresponding to a different number of samples of the signal in each matrix, the method further comprising detecting a different periodic frequency of the signal from each image based on a pattern of different colors of cells in the matrix of each image.

12. The method of claim 1, wherein the signal comprises multiple signals and assembling the image comprises assembling the multiple signals into a plurality of images, each image comprising a matrix and each matrix comprising a predetermined number of columns corresponding to a preset number of samples of each signal of the multiple signals, the method further comprising detecting a particular signal from the multiple signals using the plurality of images.

13. The method of claim 12, wherein the detecting the particular signal from the multiple signals using the images is performed by machine learning.

14. The method of claim 1, further comprising receiving the signal by an active data collection device, wherein the signal comprises a noisy, time-varying signal and wherein analyzing the image comprises identifying a periodic signal from the noisy, time-varying signal.

15. The method of claim 14, wherein the active data collection device comprises a ground telescope/laser receiver of a ground station and the noisy, time-varying signal is received from a spacecraft.

16. The method of claim 14, wherein the active data collection device is onboard a spacecraft.

17. A method for visual signal processing of a signal, comprising:
    receiving, by an active data collection device, a signal, wherein the signal comprises a noisy, time-varying signal;
    subdividing the signal into a selected number (n) of sets of data;
    assembling the signal into a plurality of images, each image comprising a matrix and each matrix comprising a plurality of cells in a different predetermined number of columns corresponding to a preset number of samples of the signal, wherein each cell of each matrix comprises a particular color corresponding to an amplitude of the sample of the signal represented by the cell; and
    analyzing each image to identify a particular periodic signal from the noisy, time-varying signal.

18. The method of claim 17, wherein the active data collection device comprises a ground telescope/laser receiver of a ground station and the noisy, time-varying signal is received from a spacecraft.

19. The method of claim 17, wherein the active data collection device is onboard a spacecraft.

20. A system for visual signal processing of a signal, comprising:
    a signal processor; and
    a memory associated with the signal processor, the memory comprising computer-readable program instructions that, when executed by the signal processor causes the processor to perform a set of functions comprising:

subdividing a signal into a selected number (n) of sets of data;

assembling the signal into an image, the image comprising a matrix, the matrix comprising a plurality of cells in a predetermined number (m) of columns and the selected number (n) of rows, wherein each cell of the matrix comprises a particular color corresponding to an amplitude of the sample of the signal represented by the cell; and analyzing the image using an image detection algorithm to determine frequency information of the signal.

21. The system of claim 20, wherein analyzing the image comprises detecting a fundamental frequency of the signal from a pattern of different colors of the cells of the matrix.

22. The system of claim 20, wherein the signal is a time domain signal and the set of functions further comprises transforming the signal from the time domain to a frequency domain based on analyzing the image.

23. The system of claim 20, wherein the set of functions further comprises selecting the selected number (n) of sets of data and the predetermined number of samples (m) of the signal to identify a set of specific frequencies that exist in the signal and a set of harmonics that exist in the signal.

24. The system of claim 20, wherein the signal comprises a transient signal and wherein analyzing the image comprises identifying one or more patterns in the transient signal that provide information about a frequency content of the signal.

25. The system of claim 20, wherein assembling the signal into an image comprises:

assembling the data in the signal into more than one image; and identifying information in the images that provides the frequency information.

26. The system of claim 20, wherein the set of functions further comprises:

using a machine learning algorithm to form the image into a plurality of vertical bars; and determining a frequency of the signal based on a repetition of a particular color of the vertical bars.

27. The system of claim 20, wherein assembling the image comprises assembling a plurality of images, each image comprising a matrix and each matrix comprising at least a different predetermined number of columns corresponding to a different number of samples of the signal in each matrix, the set of functions further comprising detecting a different periodic frequency of the signal from each image based on a pattern of different colors of cells in the matrix of each image.

* * * * *